United States Patent
Sun et al.

(10) Patent No.: US 11,829,521 B2
(45) Date of Patent: Nov. 28, 2023

(54) VR MULTI-SCREEN DISPLAY METHOD AND ELECTRONIC DEVICE

(71) Applicant: Huawei Technologies Co., Ltd., Shenzhen (CN)

(72) Inventors: Junxiong Sun, Shanghai (CN); Wei Feng, Shanghai (CN); Pei Xia, Shanghai (CN); Fenglin Lv, Shanghai (CN); Zhimin Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 46 days.

(21) Appl. No.: 17/614,897

(22) PCT Filed: May 26, 2020

(86) PCT No.: PCT/CN2020/092207
§ 371 (c)(1),
(2) Date: Nov. 29, 2021

(87) PCT Pub. No.: WO2020/238874
PCT Pub. Date: Dec. 3, 2020

(65) Prior Publication Data
US 2022/0236790 A1    Jul. 28, 2022

(30) Foreign Application Priority Data
May 30, 2019    (CN) .......................... 201910464852.9

(51) Int. Cl.
*G06F 3/01*     (2006.01)
*G06F 3/04817*  (2022.01)
*G06F 3/14*     (2006.01)

(52) U.S. Cl.
CPC .......... *G06F 3/011* (2013.01); *G06F 3/04817* (2013.01); *G06F 3/1423* (2013.01)

(58) Field of Classification Search
CPC .... G06F 3/011; G06F 3/03547; G06F 3/0481; G06F 3/04815; H04N 13/344;
(Continued)

(56) References Cited

U.S. PATENT DOCUMENTS

| | | | |
|---|---|---|---|
| 2009/0192704 A1* | 7/2009 | Geelen ................... | G01C 21/36 701/532 |
| 2017/0150139 A1 | 5/2017 | Lee et al. | |

(Continued)

FOREIGN PATENT DOCUMENTS

| | | |
|---|---|---|
| CN | 106155484 A | 11/2016 |
| CN | 106873995 A | 6/2017 |

(Continued)

*Primary Examiner* — Nelson M Rosario
(74) *Attorney, Agent, or Firm* — Conley Rose, P.C.

(57) ABSTRACT

In a virtual reality (VR) multi-screen display method, an electronic device receives a first operation from a user in an application that supports VR and the electronic device starts a VR multi-screen display mode in response to the first operation. Then, the electronic device receives a second operation from the user on a first application icon, and receives a third operation from the user on a second application icon. The electronic device creates a first virtual screen corresponding to a first application and a second virtual screen corresponding to a second application in response to the second operation and the third operation and displays content of the first application on the first virtual screen and displays content of the second application on the second virtual screen.

20 Claims, 16 Drawing Sheets

(58) Field of Classification Search
CPC .. H04N 13/356; H04N 13/359; H04N 13/398; H04N 2013/0096; H04N 2213/007
See application file for complete search history.

(56) References Cited

U.S. PATENT DOCUMENTS

| | | |
|---|---|---|
| 2017/0311025 A1 | 10/2017 | Kim et al. |
| 2018/0103284 A1 | 4/2018 | Kubo |
| 2019/0362557 A1* | 11/2019 | Lacey .................... G06F 3/167 |
| 2020/0286449 A1 | 9/2020 | Yang et al. |

FOREIGN PATENT DOCUMENTS

| | | |
|---|---|---|
| CN | 109407392 A | 3/2019 |
| CN | 109493293 A | 3/2019 |
| CN | 109741250 A | 5/2019 |
| CN | 110347305 A | 10/2019 |
| WO | 2018126957 A1 | 7/2018 |
| WO | 2018194306 A1 | 10/2018 |
| WO | 2019047876 A1 | 3/2019 |

* cited by examiner

Normal    Reshaped for display

Plane screen    3D screen

VR MULTI-SCREEN DISPLAY METHOD AND ELECTRONIC DEVICE

CROSS-REFERENCE TO RELATED APPLICATIONS

This is a U.S. National Stage of International Patent Application No. PCT/CN2020/092207 filed on May 26, 2020, which claims priority to Chinese Patent Application No. 201910464852.9 filed on May 30, 2019. Both of the aforementioned applications are hereby incorporated by reference in their entireties.

TECHNICAL FIELD

This application relates to the field of terminal technologies, and in particular, to a VR multi-screen display method and an electronic device.

BACKGROUND

A pair of virtual reality (virtual reality, VR) glasses refers to a device that isolates people's vision and hearing from the outside world by using a display of the pair of glasses, and guides a user to fully immerse in a virtual environment, where content displayed in the virtual environment changes with a viewing angle of a person. With continuous development of electronic technologies, the pair of virtual reality glasses has allowed the user to operate a control in a virtual picture based on a viewpoint and a position of the user in the virtual environment by using another peripheral device (for example, a handle).

Currently, a mobile phone may establish a connection to the pair of virtual reality glasses by using a data cable. As shown in FIG. 1a, an interface displayed in the mobile phone may be "projected" in real time to a display of the pair of virtual reality glasses. The user may operate the handle connected to the pair of virtual reality glasses, to operate the control in the virtual picture in the display of the pair of glasses. In other words, the user completes an operation on the mobile phone in the pair of virtual reality glasses.

Currently, the mobile phone may implement picture-in-picture display. That is, the mobile phone may support display interfaces of two applications to be in an active state at the same time. For example, as shown in FIG. 1b, a small window on a display of the mobile phone displays a picture of a video chat application in a floating manner, and a large window on the display displays a picture of Moments of WeChat. When the user checks Moments, the picture of the video chat application is normally played. However, although this kind of multi-window display can display active content of the two applications at the same time, the small window may shield some content of the large window. In addition, currently, because the pair of virtual reality glasses just projects in real time the interface displayed by the mobile phone, a part of a picture in the display of the pair of virtual reality glasses is also shielded, and user experience is affected.

SUMMARY

This application provides a VR multi-screen display method and an electronic device, to respectively draw content of a plurality of applications that are in an active state in an electronic device to different positions of a virtual display picture of a pair of virtual reality glasses, so as to achieve a multi-screen display effect without shielding the picture.

According to a first aspect, an embodiment of this application provides a VR multi-screen display method. The method is applied to an electronic device, and the method includes: The electronic device receives a first operation performed by a user in an application that supports VR; and the electronic device starts a VR multi-screen display mode in response to the first operation. Then, the electronic device receives a second operation performed by the user on a first application icon, and receives a third operation performed by the user on a second application icon; separately creates a first virtual screen corresponding to a first application and a second virtual screen corresponding to a second application in response to the second operation and the third operation; and displays content of the first application on the first virtual screen, and displays content of the second application on the second virtual screen.

In this embodiment of this application, content of a plurality of applications that are in an active state in the electronic device can be respectively drawn to different positions of a virtual display picture of a pair of virtual reality glasses, to achieve a multi-screen display effect without shielding the picture.

In a possible design, before the content of the first application is displayed on the first virtual screen and the content of the second application is displayed on the second virtual screen, image distortion processing is performed on the content that is of the first application and that is displayed on the first virtual screen and the content that is of the second application and that is displayed on the second virtual screen.

In this embodiment of this application, a distorted image is displayed on a display of the pair of VR glasses, so that a user can view the content of the two applications by using the pair of VR glasses.

In a possible design, after the VR multi-screen display mode is started, a display of the electronic device is in a screen-off state.

In this embodiment of this application, because the user performs watching by using the pair of VR glasses, the display of the electronic device may be in the screen-off state, thereby helping save power and preventing a misoperation.

In a possible design, a connection is established to a handle through a wireless network, to receive the second operation performed by the user on the first application icon by using the handle, and receive the third operation performed by the user on the second application icon by using the handle.

In this embodiment of this application, the user may perform an operation by using the handle, thereby improving operation convenience.

In a possible design, when an exit operation sent by the user by using the handle is received, the VR multi-screen display mode is exited, and the created first virtual screen and the created second virtual screen are cleared.

In this embodiment of this application, the electronic device implements multi-screen display by managing the virtual screens.

According to a second aspect, an embodiment of this application provides an electronic device, including a processor and a memory. The memory is configured to store one or more computer programs. When the one or more computer programs stored in the memory are executed by the processor, the electronic device is enabled to implement the method in any possible design in the foregoing first aspect.

According to a third aspect, an embodiment of this application further provides an apparatus. The apparatus includes modules/units for performing the method in any possible design in the foregoing first aspect. These modules/units may be implemented by hardware, or may be implemented by hardware executing corresponding software.

According to a fourth aspect, an embodiment of this application further provides a computer-readable storage medium. The computer-readable storage medium includes a computer program. When the computer program is run on an electronic device, the electronic device is enabled to perform the method in any possible design in the foregoing first aspect.

According to a fifth aspect, an embodiment of this application further provides a computer program product. When the computer program product runs on a terminal, the electronic device is enabled to perform the method in any possible design in the foregoing first aspect.

These aspects or other aspects of this application are clearer and more comprehensible in the following descriptions of the embodiments.

DESCRIPTION OF EMBODIMENTS

For ease of understanding, example descriptions of some concepts related to the embodiments of this application are provided for reference.

Virtual reality (virtual reality, VR) is a high and new technology emerging in recent years. The virtual reality technology is a computer simulation system that can be used to create and experience a virtual world. According to the virtual reality technology, a computer is used to simulate a virtual environment of a three-dimensional (which is also referred to as 3D) space. The virtual reality technology is a system simulation technology in which multi-source information is fused, and a three-dimensional dynamic scenario is in interaction with a physical behavior, so that a user can immerse in a VR scenario. In short, VR is a virtual reality technology in which a visual environment is rendered so that a user integrates into a VR scenario to the greatest extent and enjoys immersive experience.

A head-mounted virtual reality device (head-mounted virtual reality device) in a virtual reality display device is one of wearable devices, and is also referred to as a virtual reality helmet, a pair of VR glasses, or a glasses-type display.

The following describes the technical solutions in the embodiments of this application with reference to accompanying drawings in the embodiments of this application. The terms "first" and "second" below in the descriptions of the embodiments of this application are merely used for descriptions, and shall not be understood as an indication or implication of relative importance or implicit indication of a quantity of indicated technical features. Therefore, a feature limited by "first" or "second" may explicitly or implicitly include one or more features.

Figure 1A:
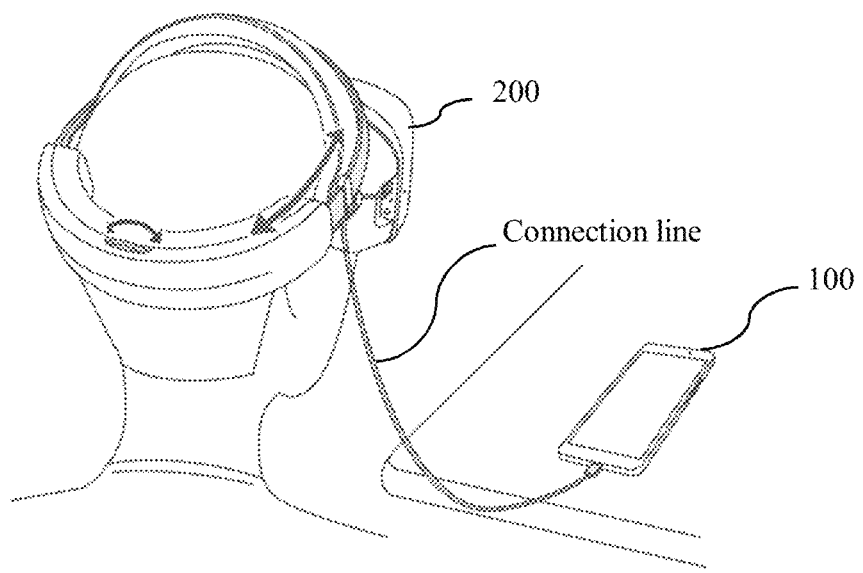
FIG. 1a and FIG. 1b are schematic diagrams of an application scenario according to an embodiment of this application.

A VR multi-screen display method provided in the embodiments of this application may be applied to a scenario that is shown in FIGS. 1a and 1n which an electronic device 100 and a pair of VR glasses 200 are interconnected through a connection line. In the scenario shown in FIG. 1a, the electronic device 100 projects content displayed on a screen thereof onto the pair of VR glasses. A user views a photo, watches a video, or plays a game by using the pair of VR glasses, and enjoys experience of a larger screen. In this embodiment of this application, the electronic device 100 may load a plurality of applications in a VR multi-screen display mode. After the user taps application icons corresponding to the plurality of applications, the electronic device may simultaneously run the plurality of applications. The pair of VR glasses 200 may respectively display display interfaces of the plurality of applications on different virtual screens in a virtual environment of a three-dimensional space. This not only prevents a picture from being shielded, but also makes the picture displayed by the pair of VR glasses 200 larger and clearer, thereby enhancing visual experience of the user.

Certainly, the electronic device 100 and the pair of VR glasses 200 may be interconnected through a communications network instead of the connection line. The communications network may be a local area network, or may be a wide area network for transferring through a relay (relay) device. For example, when the communications network is a local area network, the communications network may be a short-range communications network such as a Wi-Fi hotspot network, a Wi-Fi P2P network, a Bluetooth network, a ZigBee network, or a near field communication (near field communication, NFC) network. For example, when the communications network is a wide area network, the communications network may be a 3rd generation mobile communication technology (3rd generation mobile communication technology, 3G) network, a 4th generation mobile communication technology (4th generation mobile communication technology, 4G) network, a 5th generation mobile communication technology (5th generation mobile communication technology, 5G) network, a future evolved public land mobile network (public land mobile network, PLMN), or the internet.

In some embodiments of this application, the electronic device 100 shown in FIG. 1a may be a portable electronic device that further includes another function such as a personal digital assistant and/or a music player function, such as a mobile phone or a tablet computer. An example embodiment of the portable electronic device includes but is not limited to a portable electronic device using iOS®, Android®, Microsoft®, or another operating system. The portable electronic device may alternatively be another portable electronic device, for example, a laptop (laptop) with a touch-sensitive surface (for example, a touch panel). It should be further understood that, in some other embodiments of this application, the electronic device 100 may not be a portable electronic device, but is a desktop computer with a touch-sensitive surface (for example, a touch panel).

Figure 2:
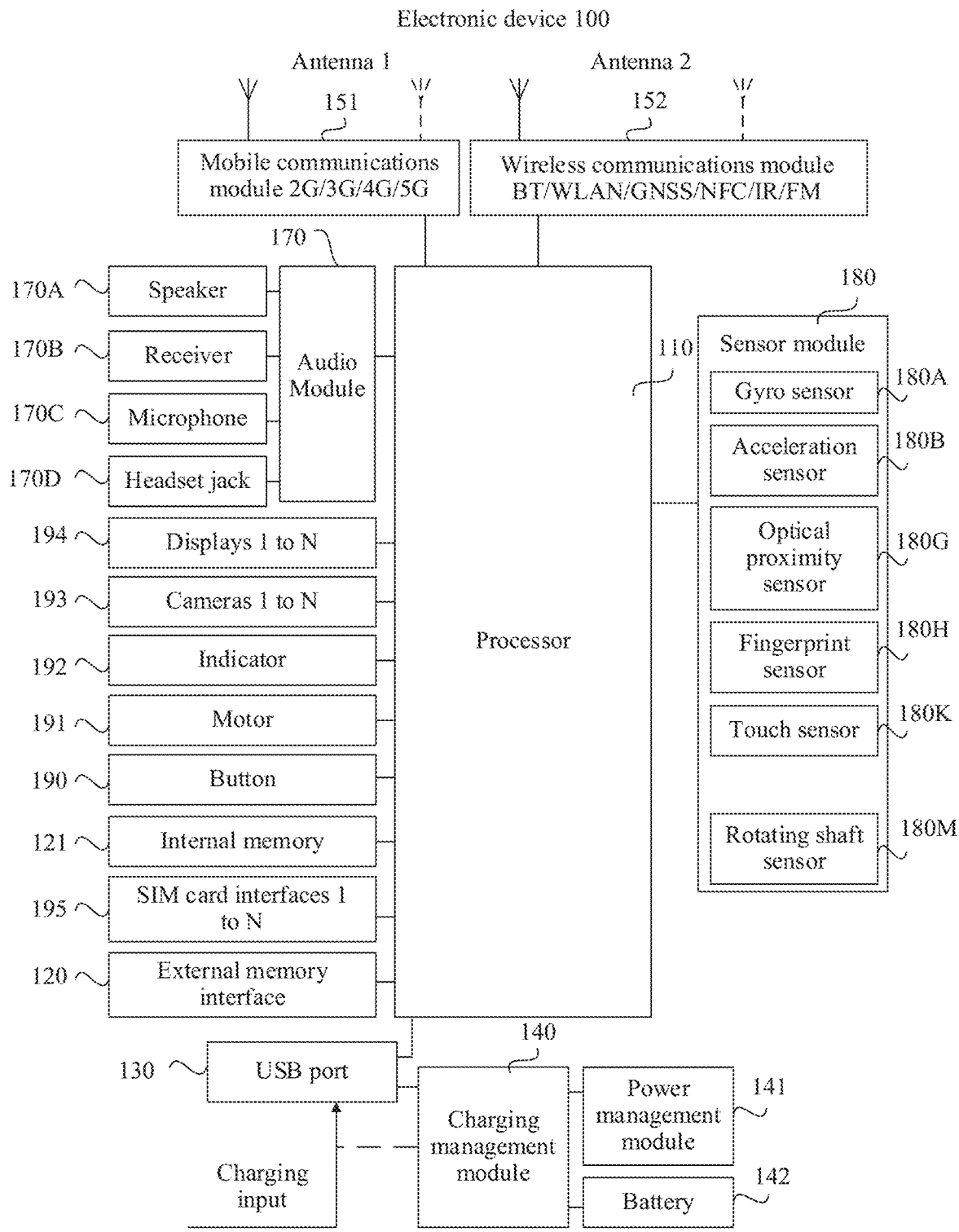
FIG. 2 is a schematic structural diagram of an electronic device according to an embodiment of this application.

For example, as shown in FIG. 2, the following uses the electronic device 100 as an example to specifically describe this embodiment.

The electronic device 100 may include a processor 110, an external memory interface 120, an internal memory 121, a USB port 130, a charging management module 140, a power management module 141, a battery 142, an antenna 1, an antenna 2, a mobile communications module 151, a wireless communications module 152, an audio module 170, a speaker 170A, a receiver 170B, a microphone 170C, a headset jack 170D, a sensor module 180, a button 190, a motor 191, an indicator 192, a camera 193, a display 194, a SIM card interface 195, and the like. The sensor module 180 may include a gyro sensor 180A, an acceleration sensor 180B, an optical proximity sensor 180G, a fingerprint sensor 180H a touch sensor 180K, and a rotating shaft sensor 180M (certainly, the electronic device 100 may further include another sensor, for example, a temperature sensor, a pressure sensor, a distance sensor, a magnetic sensor, an ambient light sensor, a barometric pressure sensor, or a bone conduction sensor, which is not shown in the figure).

It can be understood that a structure shown in this embodiment of the present invention does not constitute a specific limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (application processor. AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (Neural-network Processing Unit, NPU). Different processing units may be independent components, or may be integrated into one or more processors. The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that is just used or is cyclically used by the processor 110. If the processor 110 needs to use the instructions or the data again, the instructions or the data may be invoked directly from the memory. This avoids repeated access and reduces a waiting time of the processor 110, to improve system efficiency.

The processor 110 may run the VR multi-screen display method provided in the embodiments of this application, to respectively draw content of a plurality of applications that are in an active state in the electronic device onto different virtual screens of a pair of virtual reality glasses, so as to achieve a multi-screen display effect without shielding a picture. When different components are integrated into the processor 110, for example, a CPU and a GPU are integrated, the CPU and the GPU may cooperate to perform the VR multi-screen display method provided in the embodiments of this application. For example, in the VR multi-screen display method, some algorithms are executed by the CPU, and the other algorithms are executed by the GPU, so that processing efficiency is high.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini LED, a Micro LED, a Micro OLED, a quantum dot light emitting diode (quantum dot light emitting diode, QLED), or the like. In some embodiments, the electronic device 100 may include one or N displays 194, where N is a positive integer greater than 1.

The camera 193 (a front-facing camera, a rear-facing camera, or a camera that may serve as both a front-facing camera and a rear-facing camera) is configured to capture a static image or a video. Usually, the camera 193 may include a photosensitive element such as a lens group and an image sensor. The lens group includes a plurality of lenses (concave lenses or convex lenses), configured to: collect an optical signal reflected by a to-be-photographed object and transmit the collected optical signal to the image sensor. The image sensor generates an original image of the to-be-photographed object based on the optical signal.

The internal memory 121 may be configured to store computer executable program code, where the executable program code includes instructions. The processor 110 performs various function applications and data processing of the electronic device 100 by running the instructions stored in the internal memory 121. The internal memory 121 may include a program storage area and a data storage area. The program storage area may store code of an operating system, an application (for example, a camera application or a WeChat application), and the like. The data storage area may store data (for example, an image or a video collected by the camera application) created during use of the electronic device 100 and the like.

The internal memory 121 may further store code of a VR multi-screen display algorithm provided in the embodiments of this application. When the code that is of the VR multi-screen display algorithm and that is stored in the internal memory 121 is run by the processor 110, display interfaces of the plurality of applications may be respectively displayed on different virtual screens in a virtual environment of a three-dimensional space. This not only prevents the picture from being shielded, but also makes the picture displayed by the pair of VR glasses 200 larger and clearer, thereby enhancing visual experience of a user.

In addition, the internal memory 121 may include a high-speed random access memory, and may further include a nonvolatile memory, for example, at least one magnetic disk storage device, a flash memory, and a universal flash storage (universal flash storage, UFS).

Certainly, the code of the VR multi-screen display algorithm provided in the embodiments of this application may further be stored in an external memory. In this case, the processor 110 may run, by using the external memory interface 120, the code that is of the VR multi-screen display algorithm and that is stored in the external memory, to implement multi-screen display.

The following describes functions of the sensor module 180.

The gyro sensor 180A may be configured to determine a motion posture of the electronic device 100. In some embodiments, an angular velocity of the electronic device 100 around three axes (that is, an x axis, a y axis, and a z axis) may be determined by using the gyro sensor 180A. In other words, the gyro sensor 180A may be configured to detect a current motion status of the electronic device 100, for example, a shaken or static state.

The acceleration sensor 180B may detect magnitudes of accelerations of the electronic device 100 in all directions (usually, three axes). The gyro sensor 180A may be configured to detect the current motion status of the electronic device 100, for example, the shaken or static state. The optical proximity sensor 180G may include, for example, a light-emitting diode (LED) and an optical detector such as a photodiode. The light-emitting diode may be an infrared light-emitting diode. The mobile phone emits infrared light by using the light-emitting diode. The mobile phone detects infrared reflected light from a nearby object by using the photodiode. When sufficient reflected light is detected, the mobile phone may determine that there is an object near the mobile phone. When insufficient reflected light is detected, the mobile phone may determine that there is no object near the mobile phone.

The gyro sensor 180A (or the acceleration sensor 180B) may send detected motion status information (for example, the angular velocity) to the processor 110. The processor 110 determines, based on the motion status information, whether the electronic device 100 is currently in a handheld state or a tripod state (for example, when the angular velocity is not 0, it indicates that the electronic device 100 is in the handheld state).

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The touch sensor 180K may also be referred to as a "touch panel". The touch sensor 180K may be disposed on the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. Visual output related to the touch operation may be provided through the display 194. In some other embodiments, the touch sensor 180K may alternatively be disposed on a surface of the electronic device 100, and is at a location different from that of the display 194.

For example, the display 194 of the electronic device 100 displays a home screen, and the home screen includes icons of a plurality of applications (for example, a camera application and a WeChat application). A user taps an icon of the camera application on the home screen by using the touch sensor 180K, to trigger the processor 110 to open the camera application and turn on the camera 193. The display 194 displays an interface of the camera application, for example, a viewfinder interface.

A wireless communication function of the electronic device 100 may be implemented through the antenna 1, the antenna 2, the mobile communications module 151, the wireless communications module 152, the modem processor, the baseband processor, and the like.

The antenna 1 and the antenna 2 are configured to: transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 151 may provide a wireless communication solution that includes 2G/3G/4G/5G or the like and that is applied to the electronic device 100. The mobile communications module 151 may include at least one filter, a switch, a power amplifier, a low noise amplifier (low noise amplifier, LNA), and the like. The mobile communications module 151 may receive an electromagnetic wave through the antenna 1, perform processing such as filtering or amplification on the received electromagnetic wave, and transfer a processed electromagnetic wave to the modem processor for demodulation. The mobile communications module 151 may further amplify a signal modulated by the modem processor, and convert the signal into an electromagnetic wave through the antenna 1 for radiation. In some embodiments, at least some functional modules of the mobile communications module 151 may be disposed in the processor 110. In some embodiments, at least some functional modules of the mobile communications module 151 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then a processed low-frequency baseband signal is transferred to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 151 or another functional module.

The wireless communications module 152 may provide a wireless communication solution that includes a wireless local area network (wireless local area network, WLAN) (for example, a wireless fidelity (wireless fidelity, Wi-Fi)

network), Bluetooth (Bluetooth, BT), a global navigation satellite system (global navigation satellite system. GNSS), frequency modulation (frequency modulation, FM), a near field communication (near field communication, NFC) technology, an infrared (infrared, IR) technology, or the like and that is applied to the electronic device 100. The wireless communications module 152 may be one or more devices integrating at least one communications processing module. The wireless communications module 152 receives an electromagnetic wave through the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave through the antenna 2 for radiation. In this embodiment of this application, the electronic device 100 may be connected to a handle through Bluetooth.

In addition, the electronic device 100 may implement audio functions, for example, music playing and recording, by using the audio module 170, the speaker 170A, the receiver 170B, the microphone 170C, the headset jack 170D, the application processor, and the like. The electronic device 100 may receive an input of the button 190, and generate a key signal input related to a user setting and function control of the electronic device 100. The electronic device 100 may generate a vibration prompt (for example, an incoming call vibration prompt) by using the motor 191. The indicator 192 in the electronic device 100 may be an indicator light, may be configured to indicate a charging state and a battery level change, and may be further configured to indicate a message, a missed call, a notification, and the like. The SIM card interface 195 in the electronic device 100 is configured to connect to a SIM card. The SIM card may be inserted into the SIM card interface 195 or removed from the SIM card interface 195, to implement contact with or separation from the electronic device 100.

It should be understood that, in actual application, the electronic device 100 may include more or fewer components than those shown in FIG. 1*a*. This is not limited in this embodiment of this application.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 3A:
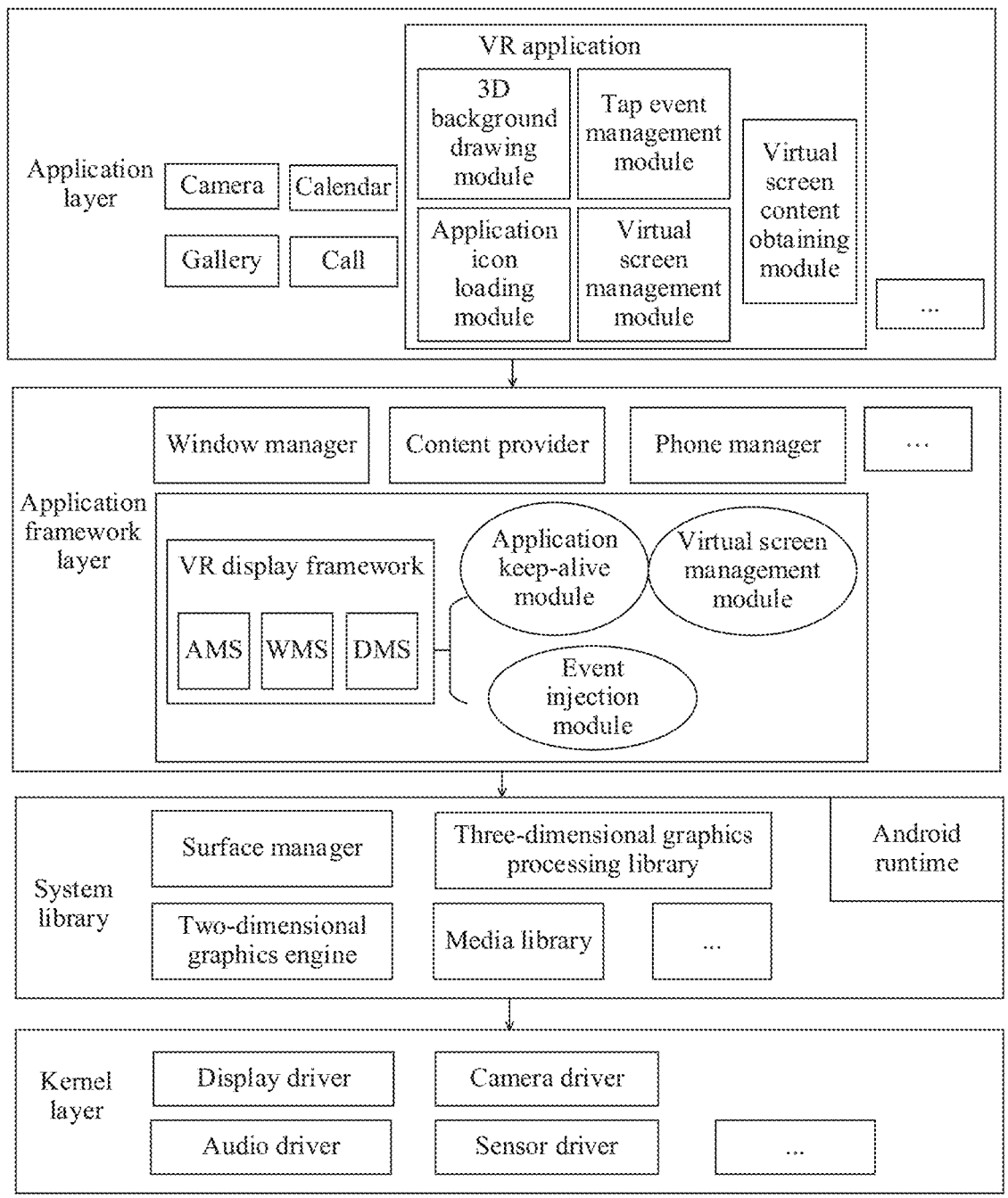
FIG. 3A to FIG. 3C are schematic architectural diagrams of an Android system according to an embodiment of this application.

FIG. 3A is a block diagram of the software structure of the electronic device 100 according to this embodiment of this application.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 3A, the application packages may include applications such as Phone, Camera, Gallery, Calendar, Call, Map, Navigation, WLAN, Bluetooth, Music, Videos, Messages, and a VR glasses application. The VR glasses application includes a 3D background drawing module, a handle event management module, an application icon loading module, a virtual screen management module, and a virtual screen content obtaining module.

The 3D background drawing module is configured to complete drawing of a background picture displayed in a 3D virtual environment, so that the user can feel like being in a real scenario.

The handle event management module is configured to process an event from the handle, so that the user can touch and control a control in a virtual display interface by operating the handle.

The application icon loading module is configured to load and display, in the virtual environment of the pair of VR glasses, icons of several applications (for example, WeChat, Weibo, and TikTok) on the electronic device.

The virtual screen management module is configured to: create a virtual screen when the user taps an application icon to start an application, and destroy the virtual screen when the user closes the application.

The virtual screen content obtaining module is configured to: when the user taps a started application, obtain content in the application, and render the content in the application through distortion, to display the content in the virtual environment.

The application framework layer provides an application programming interface (application programming interface, API) and a programming framework for an application at the application layer. The application framework layer includes some predefined functions.

As shown in FIG. 3A, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS message notification icon may include a text display view and a picture display view.

The phone manager is configured to provide a communication function of the electronic device 100, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification message. The notification manager may automatically disappear after a short pause without requiring user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

In this embodiment of this application, an activity manager service (activity manager service, AMS), a window manager service (window manager service, WMS), and a download manager service (download manager service, DMS) in the application framework layer may further include an application keep-alive module, an event injection module, and a virtual screen management module.

The application keep-alive module is configured to: after an application that has a multi-screen display mode function is started, control the electronic device to enter the VR multi-screen display mode. In this mode, the electronic device may run the plurality of applications at the same time, and support the applications to be in the active state at the same time.

The event injection module is configured to: in the multi-screen display mode, obtain an operation-corresponding event of the user, and distribute the event to a virtual screen corresponding to an application.

The virtual screen management module is configured to provide the electronic device with a capability of creating a virtual screen and destroying a virtual screen.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on a virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of audio and video in a plurality of commonly used formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3B:
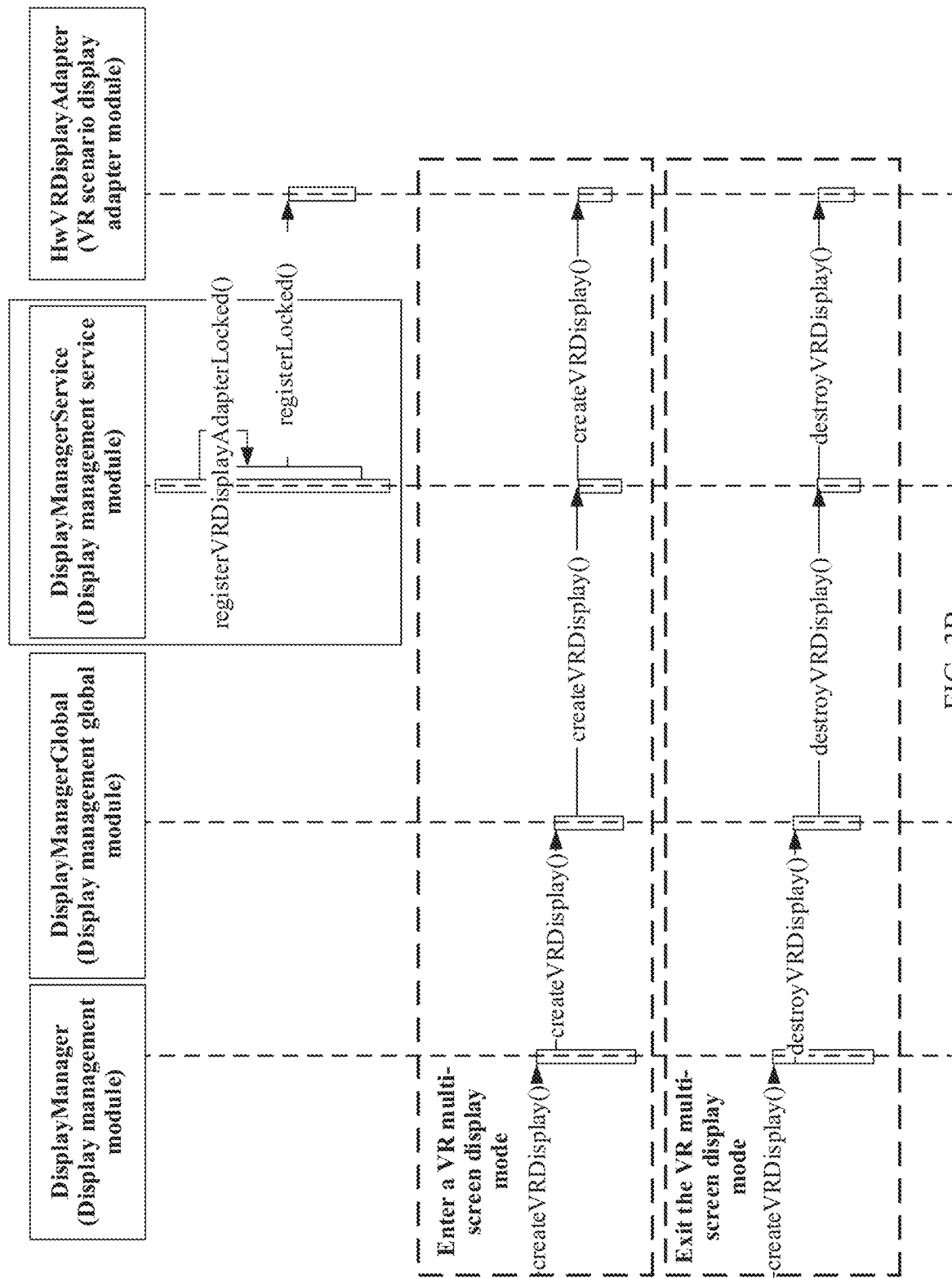

As shown in FIG. 3B, in this embodiment of this application, a VR scenario display adapter module (HwVRDisplayAdapter) creates a virtual screen and destroys the virtual screen in a multi-screen mode, to implement virtual screen management, and open a virtual screen creating interface (createVRDisplay { }) and a virtual screen destroying interface (destroyVRDisplay { }) for other services (for example, a display management module (DisplayManager), a display management global module (DisplayManagerGlobal), and a display management service module (DisplayManagerService)). The display management module, the display management global module, and the display management service module implement, by invoking the virtual screen creating interface layer by layer, a function of creating a virtual screen when entering the VR multi-screen display mode. In addition, the display management module, the display management global module, and the display management service module implement, by invoking the virtual screen creating interface layer by layer, a function of destroying a virtual screen when exiting the VR multi-screen display mode. In FIG. 3B, when the electronic device is powered on and initialized, the display management service module registers a callback required for creating a virtual screen. That is, the display management service module first invokes a VR scenario display adaption module register interface (registerVRDisplayAdapterLocked{ }), and then invokes a register interface (registerLocked{ }) to complete display management service registration.

Figure 3C:
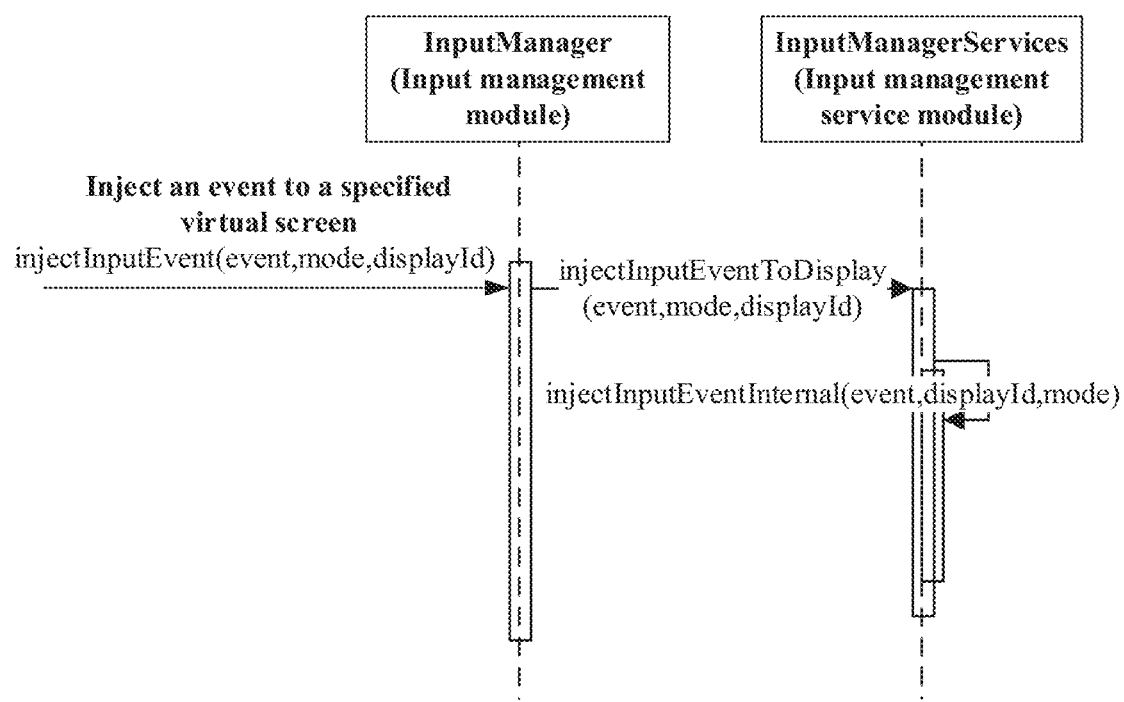

As shown in FIG. 3C, in this embodiment of this application, Android supports injection of an event into a specified screen, and a custom interface opens, for another service, the capability of injecting an event into a screen. In FIG. 3C, an input management module (IputManager) sequentially invokes an injectInputEvent(event,mode,displayId) interface, an injectInputEventToDisplay(event, mode,displayId) interface, and an injectInputEventInternal (event,displayId,mode) interface, to inject an event into a specified virtual screen.

Figure 4:
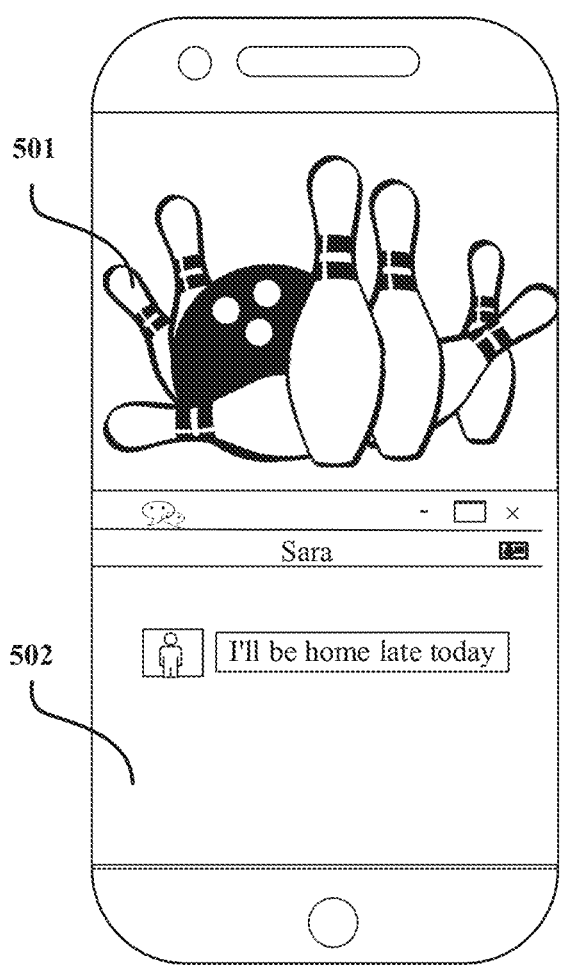
FIG. 4 is a schematic diagram of a display interface in a split-screen mode according to an embodiment of this application.
Figure 5:
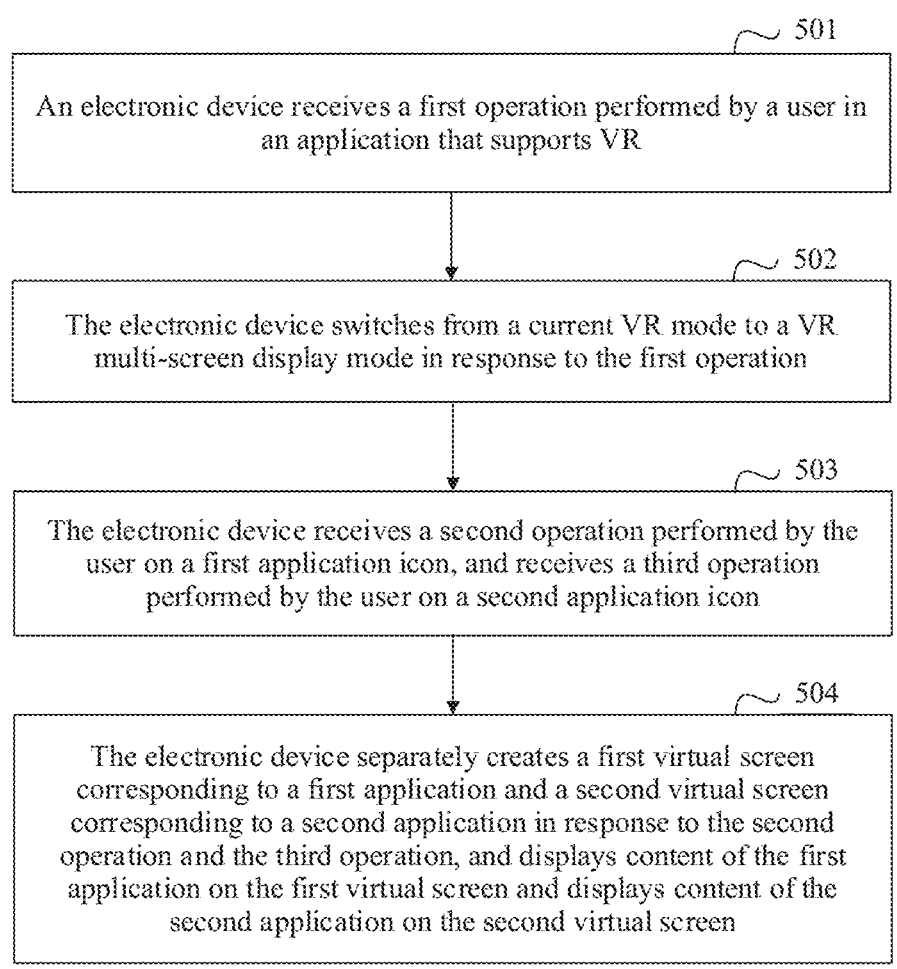
FIG. 5 is a schematic flowchart of a VR multi-screen display method according to an embodiment of this application.

As described in the background, because of limitation of a size of a screen of the electronic device, although the electronic device can use a picture-in-picture mode to display active content of two applications at the same time, content may be shielded, and user experience of a multi-window function is poor. In addition, currently, the electronic device also supports a split-screen mode. The split-screen mode may also support two applications to be in an active state at the same time. For example, as shown in FIG. 4, an upper half part of a window of a display of a mobile phone displays a picture of a gallery application, and a lower half part of the window of the display displays a chat picture of WeChat. When the user views the picture, the chat picture of WeChat is normally displayed. However, in the split-screen mode, because of limitation of a size of the display, limited content of each application can be displayed, and user experience is poor. Therefore, an embodiment of this application provides a VR multi-screen display method. The method may be performed by an electronic device connected to a virtual reality display device. A multi-screen display algorithm corresponding to the method may be integrated into an application that supports VR For specific steps, refer to FIG. 5.

Step 501. An electronic device receives a first operation performed by a user in an application that supports VR.

Figure 6:
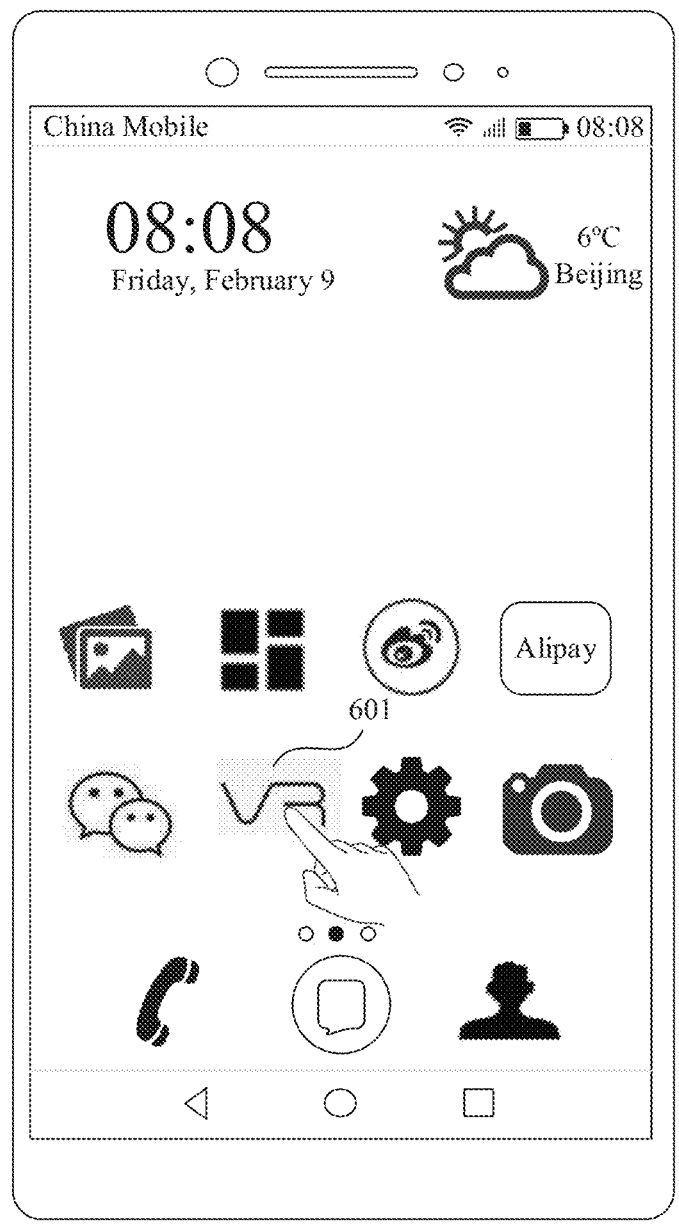
FIG. 6 is a schematic diagram of an interface according to an embodiment of this application.

For example, as shown in FIG. 6, a name of the application that supports VR may be VR glasses application. When the electronic device detects that the user acts on an icon 601 of the VR glasses application, a pair of VR glasses displays an interface shown in FIG. 11A. Alternatively, when the electronic device detects that a connection is established to a pair of VR glasses, the pair of VR glasses displays an interface shown in FIG. 11A. In this case, the electronic device may be in a screen-off state, so as to save power.

Figure 11A:
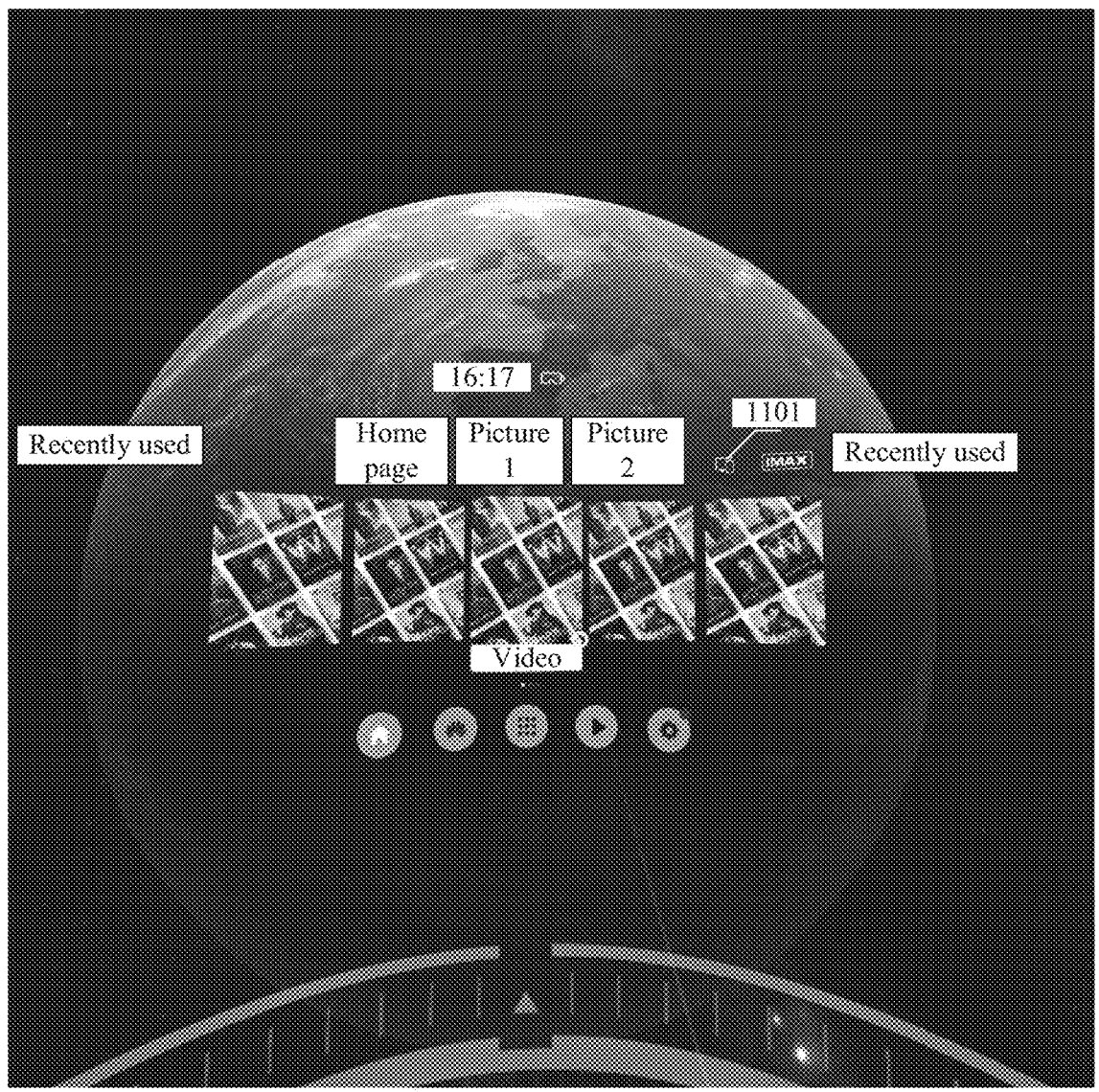
FIG. 11A to FIG. 11D are schematic diagrams of an interface according to an embodiment of this application.

If the user wants to display a plurality of applications in a VR scenario, the user taps a VR multi-screen display control 1101 in the interface shown in FIG. 11A, and the electronic device receives a tap operation performed by the user on the VR multi-screen display control 1101.

Step 502. The electronic device switches from a current VR mode to a VR multi-screen display mode in response to the first operation.

For example, when the user taps the VR multi-screen display control 1101, the electronic device switches from the current VR mode to the VR multi-screen display mode. That is, the electronic device enables a VR multi-screen display function, that is, the electronic device may respectively draw content of a plurality of applications in an active state onto different virtual screens of the pair of VR glasses at the same time.

Step 503. The electronic device receives a second operation performed by the user on a first application icon, and receives a third operation performed by the user on a second application icon.

For example, when the user taps an icon of a Weibo application pre-loaded in the VR glasses application, the electronic device receives a second operation performed by the user on the icon of the Weibo application; and when the user taps an icon of a TikTok application pre-loaded in the VR glasses application, the electronic device receives a third operation performed by the user on the icon of the TikTok application.

Step 504. The electronic device separately creates a first virtual screen corresponding to a first application and a second virtual screen corresponding to a second application in response to the second operation and the third operation; and displays content of the first application on the first virtual screen, and displays content of the second application on the second virtual screen.

In other words, the electronic device creates a corresponding virtual screen for each application, and displays content of the application on the virtual screen. For example, the first virtual screen displays an interface of the Weibo application, and the second virtual screen displays an interface of the TikTok application.

It can be learned that, the user may project content of the electronic device onto the pair of VR glasses by using the application that supports VR, and may respectively display interfaces of different applications on different virtual screens. The user may enter a VR game, may also view a panoramic picture at the same time, and the like. The user can view a picture, watch a video, play a game, and the like at the same time in the pair of VR glasses, to enjoy VR experience of a larger screen.

The electronic device includes the functional modules shown in FIG. 3A to FIG. 3C, so as to implement virtual screen creation, obtain the content of the first application and the content of the second application, and draw the content of the first application and the content of the second application onto a canvas, to complete distortion processing of a picture, and display a distorted image on a display of the pair of VR glasses. In this way, the user can view the content of the two applications at the same time by using the pair of VR glasses.

Figure 7:
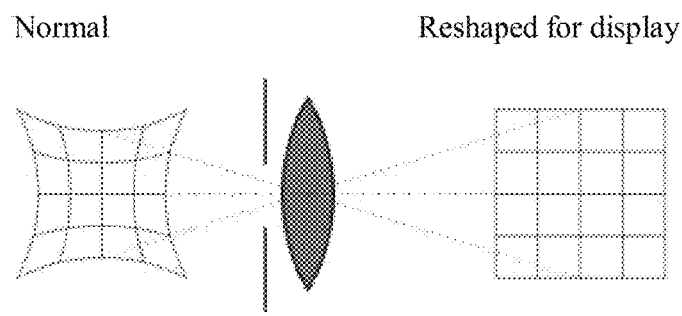
FIG. 7 is a schematic diagram of image processing of a VR principle according to an embodiment of this application.

It should be noted that, distortion processing needs to be performed on the picture because of a VR principle shown in FIG. 7. The electronic device changes a normal picture into a shape of a left part in the figure by using a distortion algorithm, and recovers the picture into a shape of a right part in the figure by using an optical function of the pair of VR glasses (lenses). In this way, content that is seen in the pair of VR glasses is in line with a realistic effect.

Figure 8:
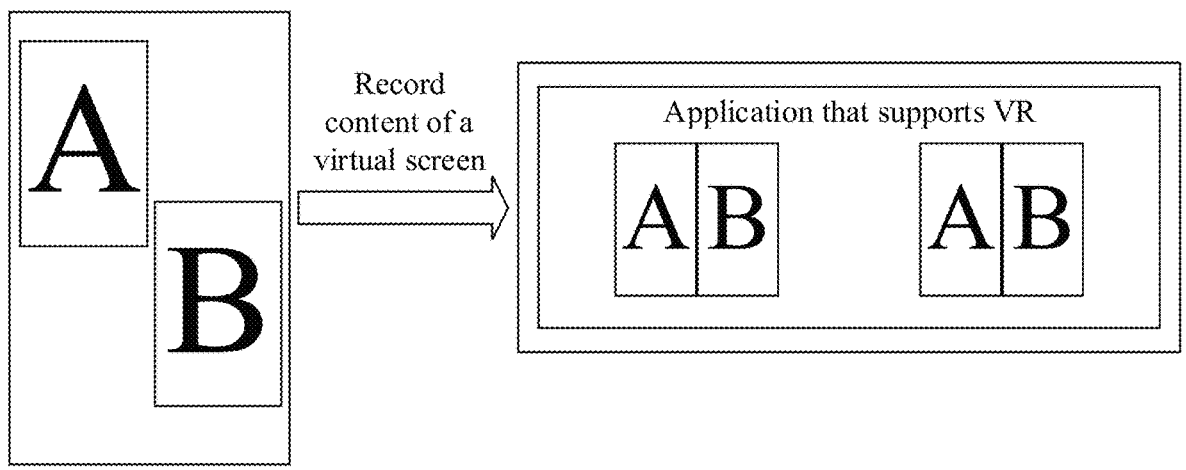
FIG. 8 is a schematic diagram of an interface according to an embodiment of this application.

In this embodiment of this application, a capability of creating a virtual screen that is provided by a system framework layer may support the electronic device to create a virtual screen on a screen of the electronic device. When the user starts a plurality of applications and displays these applications to virtual screens, content of these applications is still displayed on the screen of the electronic device. The content cannot exceed a size of the screen of the electronic device, the content is inevitably scaled down and displayed, and even a part of the content may be shielded. For example, as shown on a left side of FIG. 8, a display interface of the first application is an interface A, a display interface of the second application is an interface B, and the interface A and the interface B are displayed on a same plane screen. To implement multi-screen display in the VR scenario, the electronic device obtains display content of a plurality of virtual screens by using a screen recording interface, uniformly draws the content of the plurality of virtual screens onto a 3D screen of the VR scenario, then completes distortion processing of a picture, and finally displays the content in the pair of VR glasses. For example, as shown on a right side of FIG. 8, the display interface of the first application is an interface A, and the display interface of the second application is an interface B. Content of the interface A and content of the interface B are collectively drawn onto the 3D screen of the VR scenario, and are finally processed based on a VR distortion algorithm, so that the user can view the content by using the pair of VR glasses.

Figure 9:
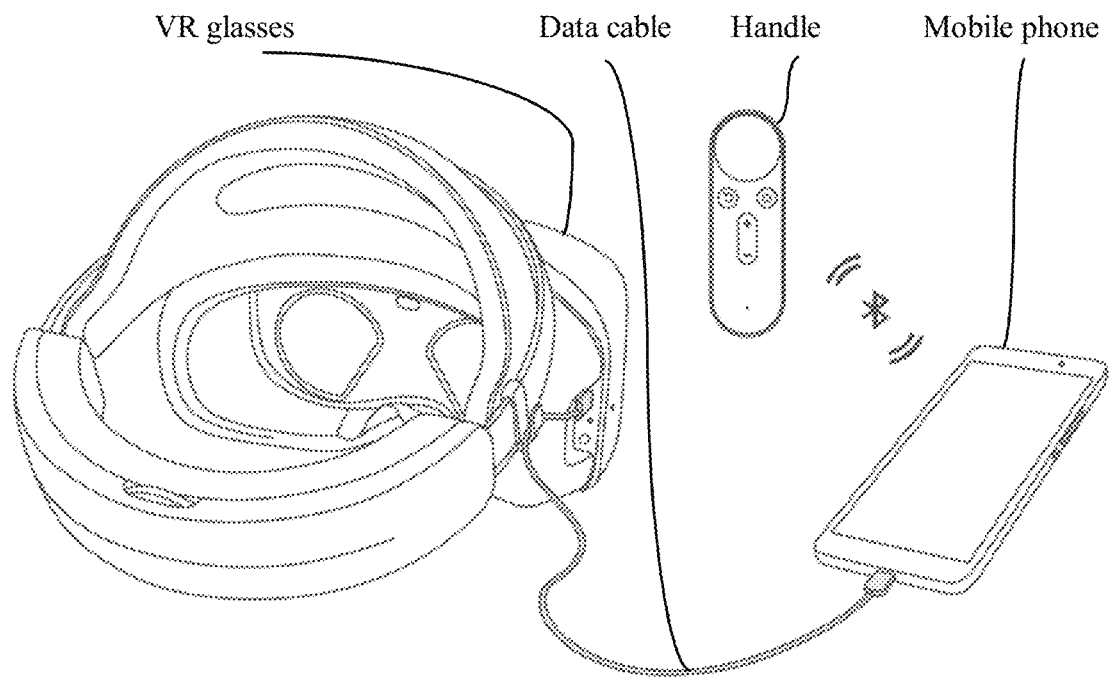
FIG. 9 is a schematic diagram of a virtual reality display system according to an embodiment of this application.

In a possible embodiment, after the electronic device enters the VR multi-screen display mode, the screen of the electronic device may be in a screen-off state, so as to save power. For example, the user may tap a handle application, and connects a mobile phone to a handle based on an application prompt by using Bluetooth. As shown in FIG. 9, when the user uses a data cable to connect the electronic device to the pair of VR glasses, the user wears the pair of VR glasses, the electronic device is in the screen-off state, and the user continuously operates by using the handle.

Figure 10:
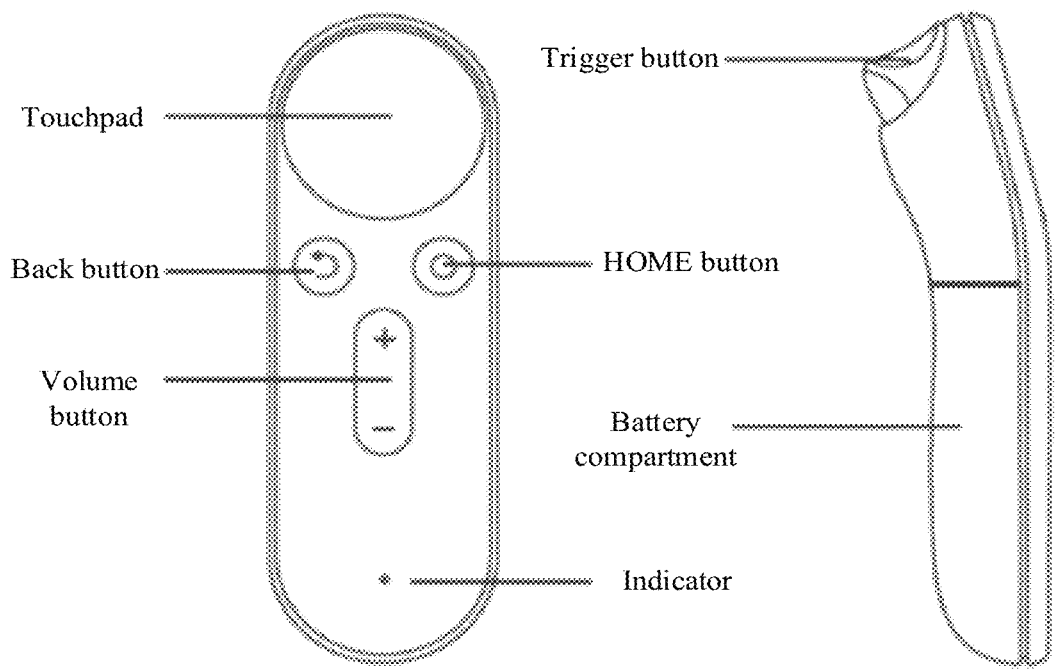
FIG. 10 is a schematic diagram of a handle according to an embodiment of this application.

Specifically, as shown in FIG. 10, the handle includes hardware structures such as a touchpad, a back button, a volume button, a HOME (main menu) button, an indicator, and a trigger button. Specific functions of the components are shown in Table 1.

TABLE 1

| Components | Functions |
|---|---|
| Touchpad | Slide up and down/left and right |
|  | Tap: confirm |
| HOME button | Press: back to HOME directly |
|  | Press and hold for 3 seconds: a picture and the handle are directed toward the front |
| Back button | Press: back to a previous level |
| Volume button | Press: adjust the volume |
| Trigger button | Press: perform customization in an application |
| Battery compartment | for installing a battery and supplying power to the handle |
| Indicator | Steady on: connection succeeds |
|  | Off: off or sleep |
|  | Blinking: pairing |
|  | On/off breathing: low battery |

It can be learned from Table 1 that, when the user presses the touchpad and moves the handle, a sliding operation may be performed; when the user taps the touchpad on the handle, a tap operation may be performed; and with a quick press on the HOME button, the user may return to a standby interface of the mobile phone.

In a possible embodiment, when the electronic device receives an exit operation of the user by using the handle, the electronic device switches from the VR multi-screen display mode to the VR mode, and clears the created virtual screens. For example, when the user long presses the HOME button, or when the user takes off the pair of VR glasses, the electronic device switches from the VR multi-screen display mode to the VR mode, and clears the created virtual screens.

Figure 12:
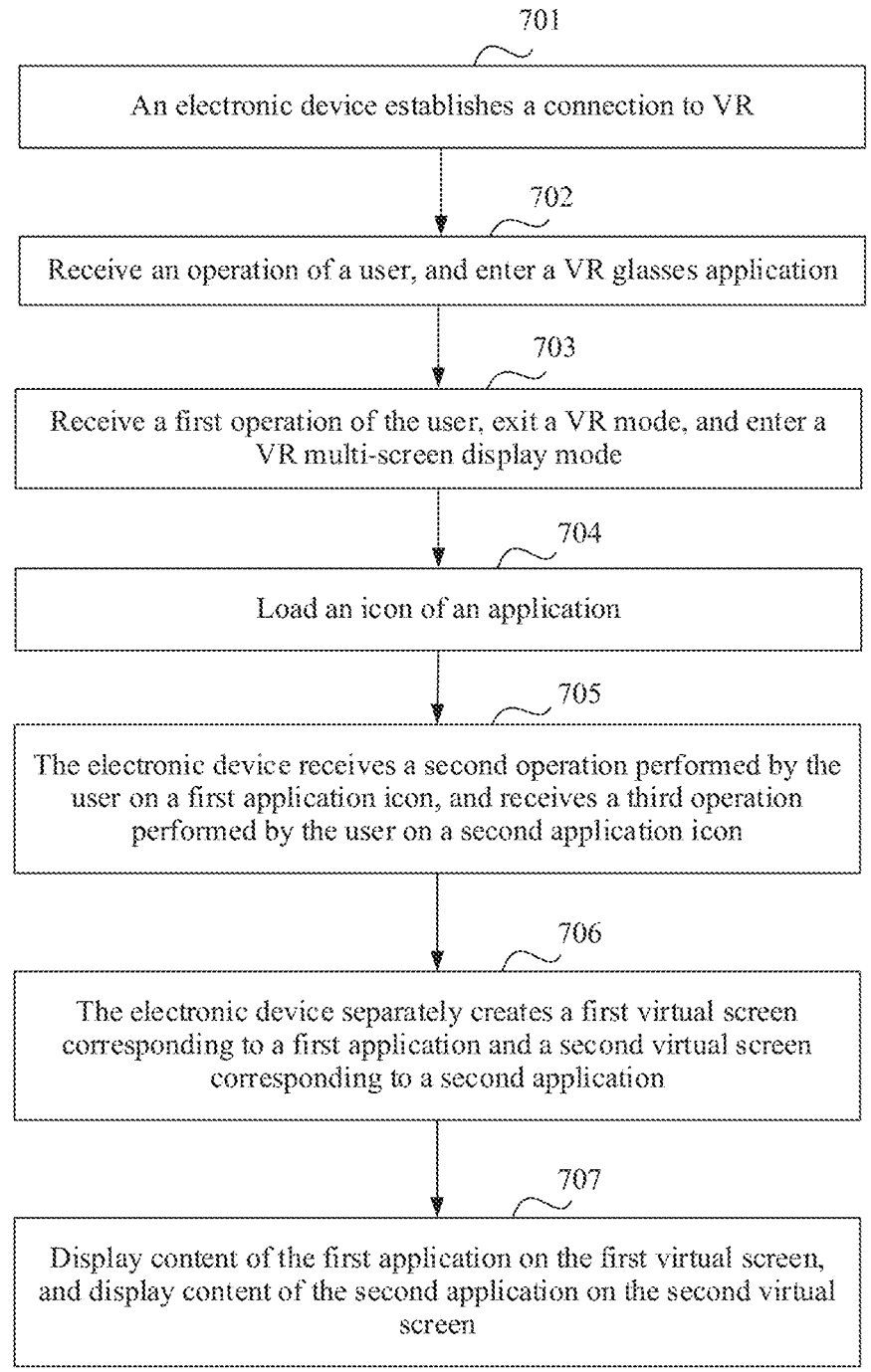
FIG. 12 is a schematic flowchart of a VR multi-screen display method according to an embodiment of this application.

The following describes the VR multi-screen display method provided in the embodiments of this application by using an example and with reference to the accompanying drawings and an actual application scenario. For specific steps, refer to FIG. 12.

Step 701. An electronic device establishes a connection to VR. As shown in FIG. 9, before a user uses the pair of VR glasses, the user connects a mobile phone to the pair of VR glasses by using a data cable, and then downloads and installs a VR glasses application and a handle application based on a prompt. Then, the user wears the pair of virtual reality glasses, and adjusts a head strap to ensure that eyes are aligned with centers of lenses. If a picture on a screen is not clear, the user may rotate a pupil spacing adjustment wheel or adjust a wearing position of the pair of virtual reality glasses to make the picture clear.

Step 702. When the electronic device is connected to the pair of VR glasses, the electronic device receives an operation of a user, and enters a VR glasses application. For example, FIG. 11A shows content seen by the user after wearing the pair of VR glasses. The user may tap a VR multi-screen display control 1101 by operating a handle, and then the electronic device exits a current VR mode and starts a VR multi-screen display mode.

Step 703. The electronic device receives a first operation of the user, exits a VR mode, and enters a VR multi-screen display mode.

Figure 11B:
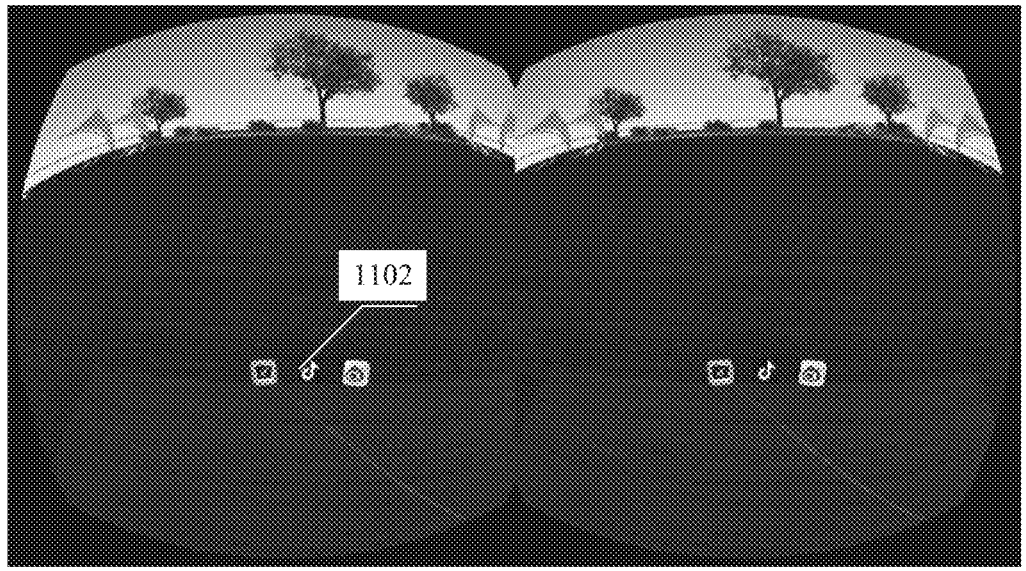

Step 704: The pair of VR glasses loads and displays icons of several applications in a VR scenario corresponding to the VR multi-screen display mode. As shown in FIG. 11B, an interface includes an icon 1102 of a TikTok application and an icon 1103 of a Weibo application.

Step 705 to step 707. The electronic device receives a second operation performed by the user on a first application icon, and receives a third operation performed by the user on a second application icon; and the electronic device separately creates a first virtual screen corresponding to a first application and a second virtual screen corresponding to a second application, and displays content of the first application on the first virtual screen and displays content of the second application on the second virtual screen.

Figure 1B:
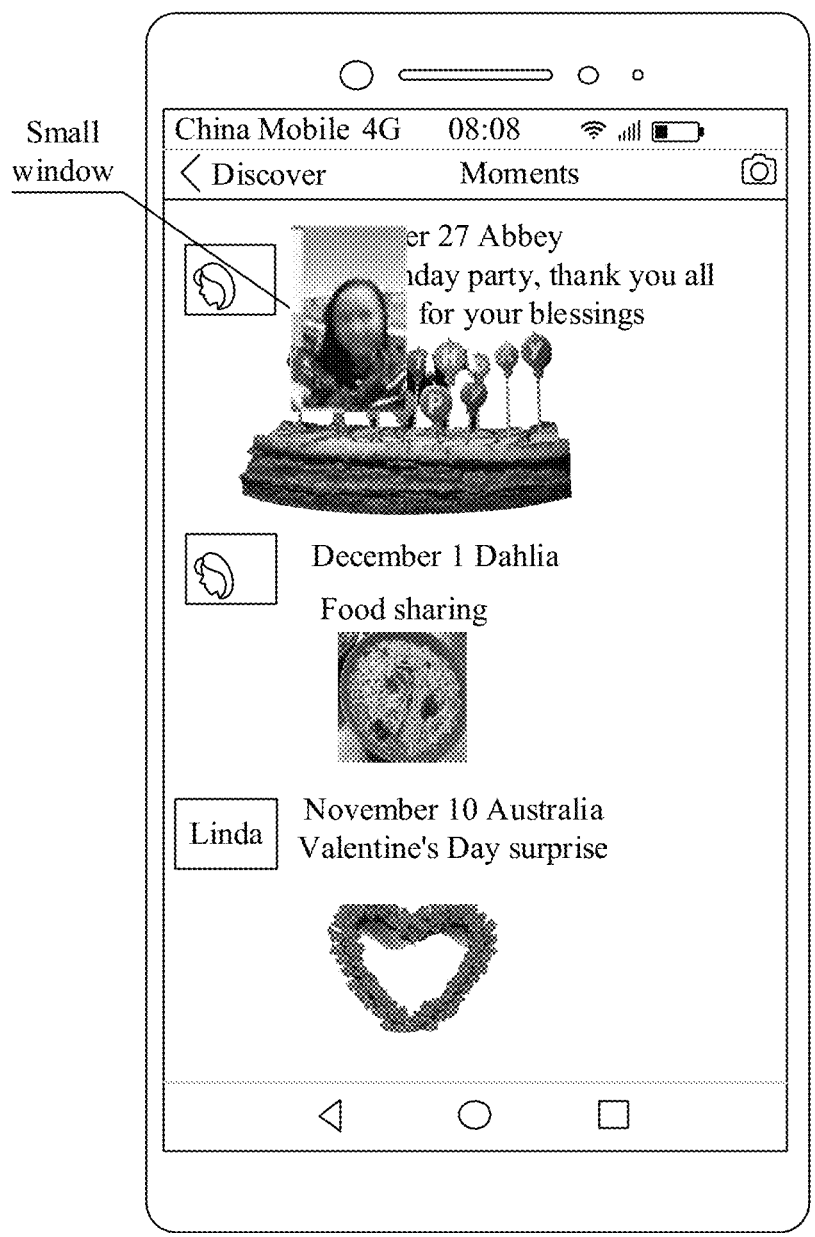
Figure 11C:
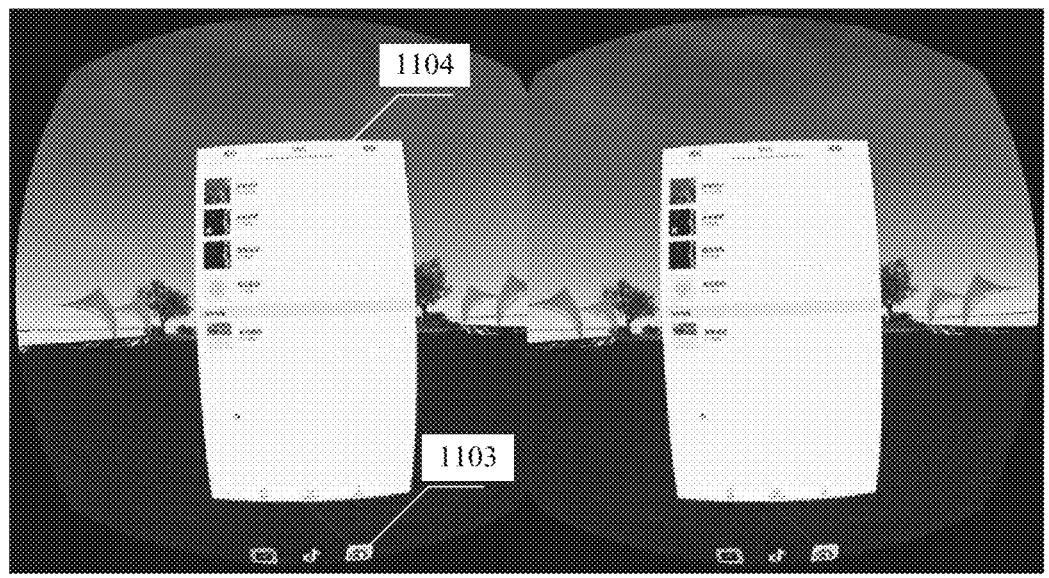
Figure 11D:
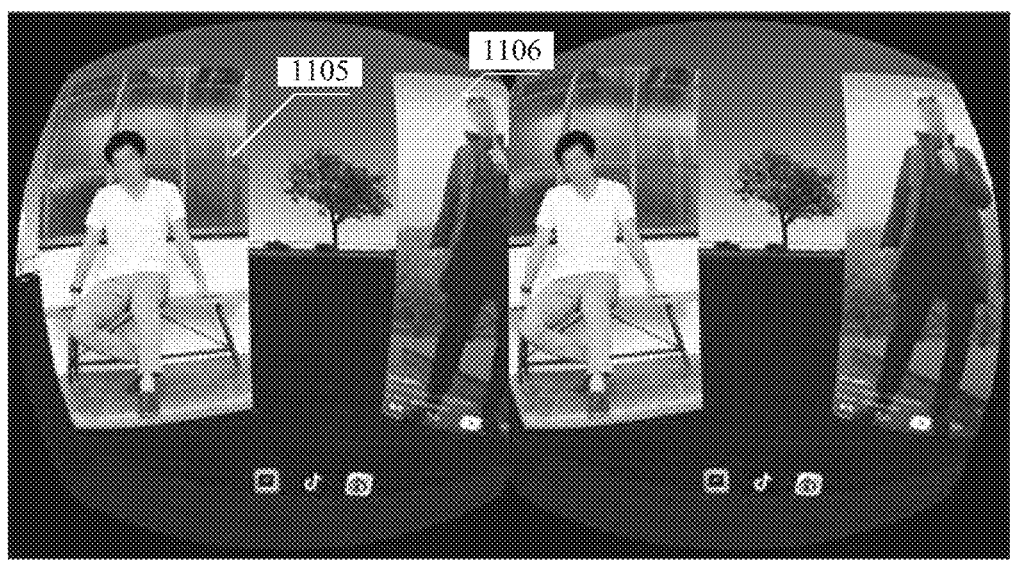

For example, as shown in FIG. 1B, when the user taps the icon 1102 of the TikTok application, the electronic device creates a virtual screen, and renders obtained content of TikTok onto the virtual screen. As shown in FIG. 11C, when the user taps the icon 1103 of the Weibo application, the electronic device creates a virtual screen, and renders obtained content of Weibo onto the virtual screen 1104. Finally, a canvas of the VR scenario generated by the electronic device displays a left eye part and a right eye part, and display content of the Weibo application and display content of the TikTok application are displayed in full screen in each part, as shown in 1105 and 1106 in FIG. 11D.

After step 707, if the user takes off the pair of glasses or the user long presses a HOME button of the handle, the electronic device exits the VR multi-screen display mode, and clears the created virtual screens.

In this embodiment of this application, the electronic device may respectively display display interfaces of a plurality of applications on different virtual screens in a virtual environment of a three-dimensional space. This not only prevents a picture from being shielded, but also makes the picture displayed by the pair of VR glasses 200 larger and clearer, thereby enhancing visual experience of the user.

An embodiment of this application further provides a computer-readable storage medium. The computer-readable storage medium includes a computer program, and when the computer program is run on an electronic device, the electronic device is enabled to perform any possible implementation of the foregoing method.

An embodiment of this application further provides a computer program product. When the computer program product runs on an electronic device, the electronic device is enabled to perform any possible implementation of the foregoing method.

Figure 13:
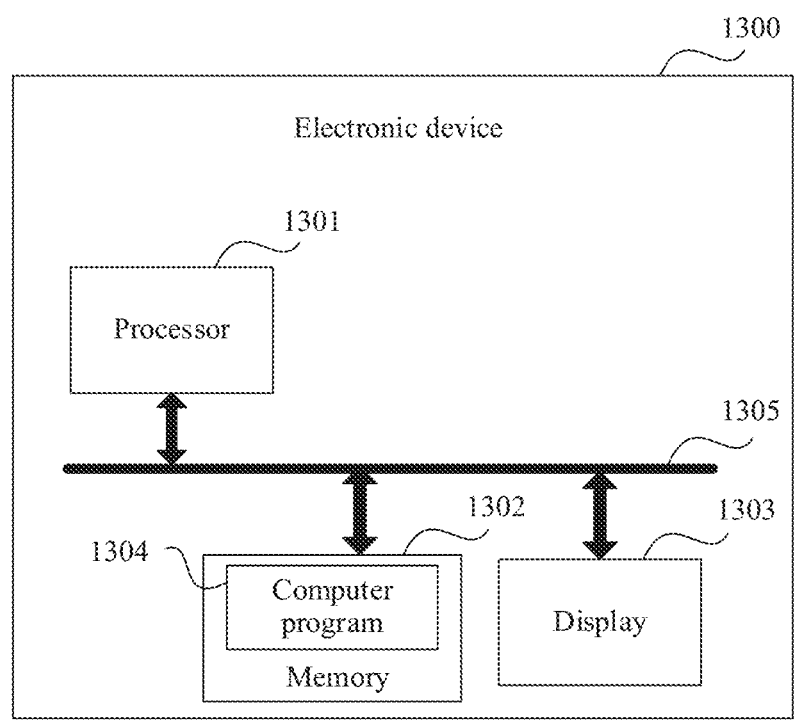
FIG. 13 is a schematic structural diagram of an electronic device according to an embodiment of this application.

In some other embodiments of this application, an embodiment of this application discloses an electronic device. As shown in FIG. 13, the electronic device may include one or more processors 1301, a memory 1302, a display 1303, one or more application programs (not shown), and one or more computer programs 1304. The foregoing devices may be connected through one or more communications buses 1305. The one or more computer programs 1304 are stored in the memory 1302 and are configured to be executed by the one or more processors 1301. The one or more computer programs 1304 include instructions. The instructions may be used to perform the steps in the embodiments corresponding to FIG. 5 to FIG. 12.

The foregoing descriptions about the implementations allow a person skilled in the art to clearly understand that, for the purpose of convenient and brief description, division into the foregoing functional modules is merely used as an example for description. In actual application, the foregoing functions can be allocated to different functional modules based on a requirement for implementation, that is, an inner structure of an apparatus is divided into different functional modules to implement all or some of the functions described above. For detailed working processes of the foregoing system, apparatus, and unit, refer to corresponding processes in the foregoing method embodiments. Details are not described herein again.

Functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and is sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods in the embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method implemented by an electronic device, wherein the method comprises:
   receiving, from a user, a first operation, in an application that supports virtual reality (VR);
   starting, in response to the first operation, a VR multi-screen display mode;
   establishing a connection to a handle through a wireless network;
   receiving, from the handle, a second operation on a first application icon, wherein the first application icon is a first control in the application;
   receiving, from the handle, a third operation on a second application icon, wherein the second application icon is a second control in the application;
   creating, in response to the second operation, a first virtual screen corresponding to a first application;
   creating, in response to the third operation, a second virtual screen corresponding to a second application;
   displaying first content of the first application on the first virtual screen;
   displaying second content of the second application on the second virtual screen;
   receiving an exit operation comprising a long press on a home button of the handle;
   exiting, in response to the exit operation, the VR multi-screen display mode; and
   clearing, in response to the exit operation, the first virtual screen and the second virtual screen.

2. The method of claim 1, wherein before displaying the first content and the second content, the method further comprises:
   performing first image distortion processing on the first content; and
   performing second image distortion processing on the second content.

3. The method of claim 2, further comprising switching a display of the electronic device to a screen-off state after starting the VR multi-screen display mode.

4. The method of claim 1, wherein the electronic device displays in a VR mode before starting the VR multi-screen display mode.

5. The method of claim 1, further comprising:
   receiving user input for controlling the first content or the second content from the handle.

6. The method of claim 1, wherein the handle is configured for activating an electronic device function of a touchpad, a back button, a volume button, a main menu button, an indicator, or a trigger button.

7. The method of claim 1, further comprising switching, in response to exiting the VR multi-screen display mode, to the VR mode.

8. An electronic device comprising:
   a transceiver comprising a handle configured for receiving user input;
   a memory configured to store instructions; and
   a processor coupled to the transceiver and the memory, wherein when executed by the processor, the instructions cause the electronic device to:
   receive, from the handle, a first operation in an application that supports virtual reality (VR);
   start, in response to the first operation, a VR multi-screen display mode;
   receive, from the handle, a second operation on a first application icon, wherein the first application icon is a first control in the application;
   receive, from the handle, a third operation on a second application icon, wherein the second application icon is a second control in the application;
   create, in response to the second operation, a first virtual screen corresponding to a first application;
   create, in response to the third operation, a second virtual screen corresponding to a second application;
   display first content of the first application on the first virtual screen; and
   display second content of the second application on the second virtual screen;
   receive an exit operation comprising a long press on a home button of the handle;
   exit, in response to the exit operation, the VR multi-screen display mode; and
   clear, in response to the exit operation, the first virtual screen and the second virtual screen.

9. The electronic device of claim 8, wherein when executed by the processor, the instructions further cause the electronic device to:
   perform first image distortion processing on the first content; and
   perform second image distortion processing on the second content.

10. The electronic device of claim 9, further comprising a display, wherein the display is in a screen-off state after starting the VR multi-screen display mode.

11. The electronic device of claim 8, wherein when executed by the processor, the instructions further cause the electronic device to receive user input for controlling the first content or the second content from the handle.

12. The electronic device of claim 8, wherein the handle further comprises:
    a touchpad control;
    a back button control;
    a volume button control;
    a main menu control;
    an indicator; or
    a trigger control.

13. The electronic device of claim 8, wherein when executed by the processor, the instructions further cause the electronic device to switch, in response to exiting the VR multi-screen display mode, to the VR mode.

14. A computer program product comprising computer-executable instructions that are stored on a non-transitory computer-readable storage medium and that, executed by a processor, cause an electronic device to:
    receive, from a user, a first operation in an application that supports virtual reality (VR);
    start, in response to the first operation, a VR multi-screen display mode;
    establish a connection to a handle through a wireless network;
    receive, from the handle, a second operation on a first application icon, wherein the first application icon is a first control in the application;
    receive, from the handle, a third operation on a second application icon, wherein the second application icon is a second control in the application;
    create, in response to the second operation, a first virtual screen corresponding to a first application;

create, in response to the third operation, a second virtual screen corresponding to a second application;

display first content of the first application on the first virtual screen;

display second content of the second application on the second virtual screen receive an exit operation comprising comprises a long press on a home button of the handle;

exit, in response to the exit operation, the VR multi-screen display mode; and clear, in response to the exit operation, the first virtual screen and the second virtual screen.

15. The computer program product of claim 14, wherein the computer-executable instructions further cause the electronic device to:

perform first image distortion processing on the first content; and perform second image distortion processing on the second content.

16. The computer program product of claim 15, wherein a display of the electronic device is in a screen-off state after starting the VR multi-screen display mode.

17. The computer program product of claim 14, wherein the computer-executable instructions further cause the electronic device to display in a VR mode before starting the VR multi-screen display mode.

18. The computer program product of claim 14, wherein the computer-executable instructions further cause the electronic device to:

receive user input for controlling the first content or the second content from the handle.

19. The computer program product of claim 18, wherein the computer-executable instructions further cause the electronic device to receive, from the handle, instructions for activating an electronic device function of a touchpad, a back button, a volume button, a main menu button, an indicator, or a trigger button.

20. The computer program product of claim 14, wherein the computer-executable instructions further cause the electronic device to switch, in response to exiting the VR multi-screen display mode, to the VR mode.

* * * * *